(12) United States Patent
Asao et al.

(10) Patent No.: US 8,718,292 B2
(45) Date of Patent: May 6, 2014

(54) NOISE REDUCTION DEVICE AND NOISE REDUCTION SYSTEM

(75) Inventors: Yoshifumi Asao, Hyogo (JP); Hiroyuki Kano, Hyogo (JP); Masaaki Higashida, Osaka (JP); Tsuyoshi Maeda, Hyogo (JP); Toshihiro Ezaki, Osaka (JP)

(73) Assignee: Panasonic Corporation, Osaka (JP)

( * ) Notice: Subject to any disclaimer, the term of this patent is extended or adjusted under 35 U.S.C. 154(b) by 725 days.

(21) Appl. No.: 12/594,214

(22) PCT Filed: Dec. 11, 2008

(86) PCT No.: PCT/JP2008/003711
§ 371 (c)(1),
(2), (4) Date: Dec. 18, 2009

(87) PCT Pub. No.: WO2009/078146
PCT Pub. Date: Jun. 25, 2009

(65) Prior Publication Data
US 2010/0104110 A1    Apr. 29, 2010

(30) Foreign Application Priority Data
Dec. 14, 2007    (JP) .................................. 2007-322787

(51) Int. Cl.
*G10K 11/16*    (2006.01)
(52) U.S. Cl.
USPC .......................................................... 381/71.4
(58) Field of Classification Search
USPC ........... 381/71.1, 71.3, 71.4–71.8, 57, 56, 94, 381/86; 702/195
See application file for complete search history.

(56) References Cited

U.S. PATENT DOCUMENTS

| | | | | |
|---|---|---|---|---|
| 5,845,236 A | * | 12/1998 | Jolly et al. | 702/195 |
| 2006/0188107 A1 | | 8/2006 | Inoue et al. | |
| 2008/0019536 A1 | * | 1/2008 | Marrot | 381/71.4 |
| 2010/0111317 A1 | * | 5/2010 | Asao et al. | 381/71.4 |

FOREIGN PATENT DOCUMENTS

| | | | | |
|---|---|---|---|---|
| JP | 01-270489 A | | 10/1989 | |
| JP | 5-273987 | * | 10/1993 | ............. G10K 11/16 |
| JP | 05-281980 A | | 10/1993 | |
| JP | 05-289676 A | | 11/1993 | |
| JP | 06-161468 A | | 6/1994 | |
| JP | 06-167985 A | | 6/1994 | |
| JP | 06161468 | * | 6/1994 | ............. G10K 11/16 |
| JP | 06-332475 A | | 12/1994 | |
| JP | 2994809 B2 | | 12/1999 | |
| JP | 2000-322066 A | | 11/2000 | |

OTHER PUBLICATIONS

International Search Report for PCT/JP2008/003711.

\* cited by examiner

*Primary Examiner* — Lun-See Lao
(74) *Attorney, Agent, or Firm* — Pearne & Gordon LLP

(57) ABSTRACT

It includes a microphone for detecting noise emitted from a noise source, a noise controller for generating control sound signal to reduce noise detected by the microphone based on information from the microphone, and a speaker for outputting control sound based on control sound signal from the noise controller, wherein a plurality of microphones and speakers are arranged for each seat, and a plurality of microphones are arranged in higher density for each seat in a specific direction.

11 Claims, 9 Drawing Sheets

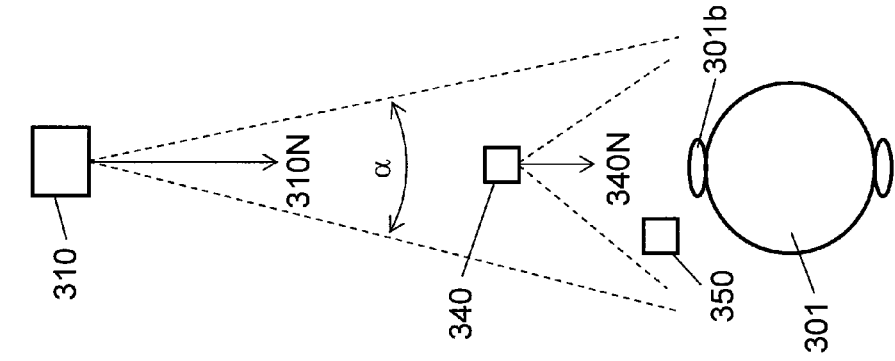
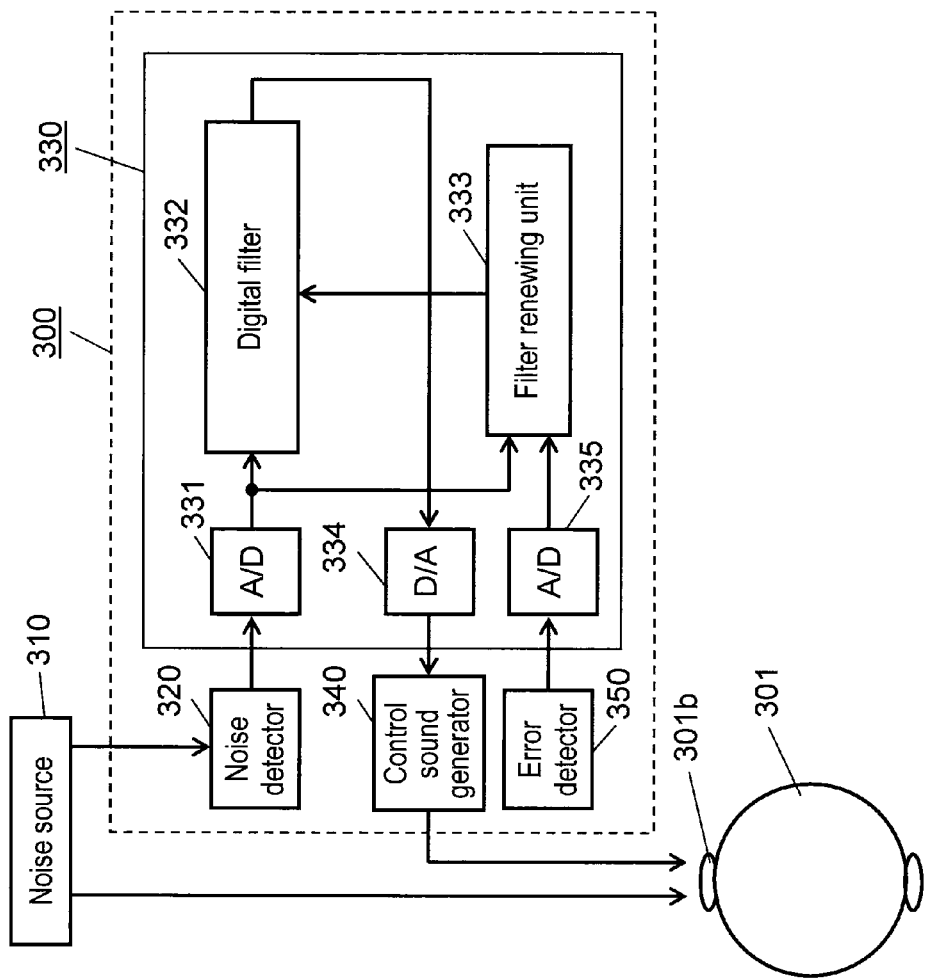

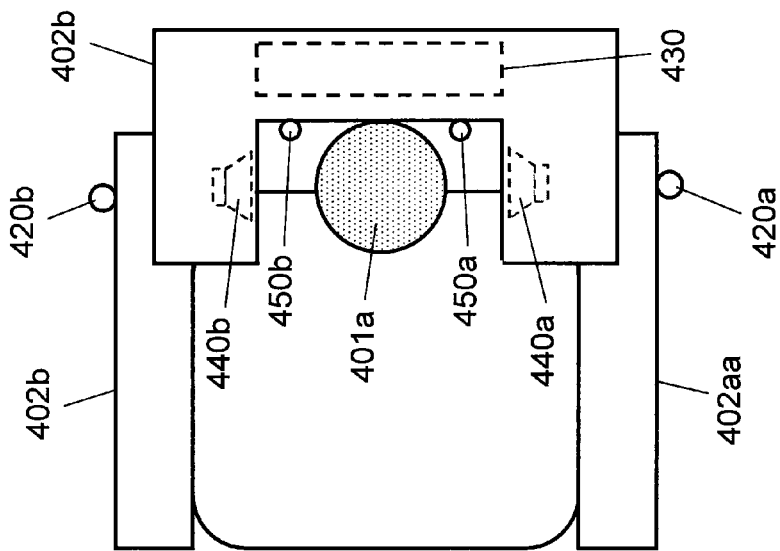
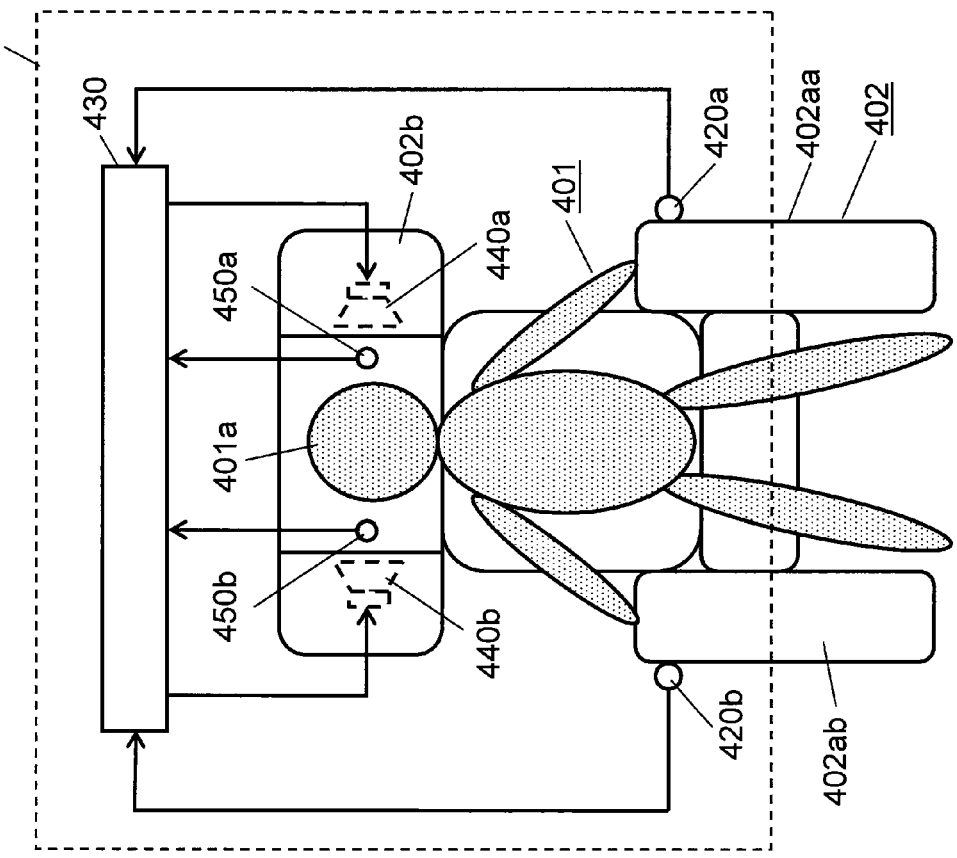
FIG. 4B
FIG. 4A

NOISE REDUCTION DEVICE AND NOISE REDUCTION SYSTEM

This Application is a U.S. National Phase Application of PCT International Application PCT/JP2008/003711.

TECHNICAL FIELD

The present invention relates to a noise reduction device and a noise reduction system in a seat, and particularly, it relates to a noise reduction device and a noise reduction system to be used in a closed structure such as airplane and train.

BACKGROUND ART

In airplanes and trains which generate considerable noise, when information is offered by voice service to the users, problems arise with noise generated at the seats.

In use of an inside space whose boundary is formed by a continuous wall as in an airplane or a train, the place used is a kind of closed structure, and if noise sources exist inside and outside the place used, it will cause a noise environment to be fixed for the users. As a result, although it depends upon the level of noise, the noise exerts physical and mental pressure upon the user, worsening the comfortability of the place used. Particularly, in the case of offering a service to the passengers in the cabin of an airplane, worsening of the comfortability will give serious hindrance to the quality of service operation.

Particularly, in the case of an airplane, main noise sources include noise generated from machines such as propellers and engines for producing thrust forces of the airplane, and sound of air current generated as the airplane body moves in the air such as sound generated by end portions or both wings of the airplane flying through the air. In this case, inside noise makes the passengers feel uncomfortable and also causes hindrance to the voice service. Accordingly, the situation is strongly desired to be improved.

On the other hand, as a measure for reducing noise in a closed room, conventionally, a method using a passive attenuation means is commonly employed. In the conventional method, a sound insulation material having acoustic absorptivity such as partition wall material or absorptive material is arranged between the closed structure and the noise generating source. A high-density partition wall material is used as partition wall material, and a sound absorbing sheet is used as absorptive material. A material having acoustic absorptivity is generally high-density, and such a high-density material increases in weight. As the weight increases, it causes the flying fuel to increase, and the flying distance to shorten. Accordingly, it results in worsening of the economy and function as an airplane. Also, as a structural material, lowering of the strength such as being easy to be damaged and worsening of the design function such as quality of the touch cannot be ignored.

In order to solve the problem involved in the measure for noise by using a passive attenuation means, as a method of reducing noise by using an active attenuation means, a conventional method of generating sound wave having a phase opposite to the phase of noise is generally executed. By using this method, it is possible to lower the noise level at the noise source or in the vicinity thereof in order to prevent the noise from being propagated to regions required to be reduced in noise. As a specific example, an audio-erasing device has been proposed, comprising a microphone for detecting sound generated from noise sources, a controller which amplifies the electric signal input from the microphone and reverses the phase, and a speaker which converts the electric signal input from the controller to sound and transmits the sound (e.g. refer to Patent document 1).

Also, recently examined is a method of executing measures for noise from the viewpoint of improving the comfortability at passenger seats, which is based on a method of reducing noise by using the above-mentioned active attenuation means. For example, those proposed include a method of disposing a noise reducing device in each seat and installing a speaker, microphone and controller in the vicinity of the seat, and a method of increasing the noise reducing effect for the user by disposing a plurality of speakers and microphones in the vicinity of the user at the seat (e.g. refer to Patent documents 2 to 3).

However, for effectively reducing noise by using the above-mentioned method, there arise such problems that it is necessary to increase the number of microphones installed, the cost of the equipment is increased, and the calculated load for noise reduction becomes greater.

Patent document 1 Unexamined Japanese Patent Publication H1-270489

Patent document 2 Unexamined Japanese Patent Publication H5-289676

Patent document 3 Unexamined Japanese Patent Publication H5-281980

SUMMARY OF THE INVENTION

The noise reduction device of the present invention comprises a noise detector for detecting noise generated from at least one noise source, a noise controller which reverses the phase of control signal for eliminating the noise detected by the noise detector, and a control sound output unit for outputting a control sound based on the control signal from the noise controller, wherein a plurality of noise detectors and control sound output units are disposed for each seat, and the plurality of noise detectors are arranged in higher density for each seat in a specific direction.

Due to such a configuration, it is possible to specify the direction mainly with respect to a specific noise source and to dispose the noise detectors higher in density with respect to the specified direction. As a result, it is possible to improve the efficiency of noise detection and to provide a noise reduction device capable of assuring high efficiency and high quality.

Also, the noise reduction device of the present invention comprises a noise detector for detecting noise emitted from at least one noise source, a noise controller which produces control signal for eliminating the noise detected by the noise detector, a control sound output unit for outputting control sound based on the control signal from the noise controller, and an error sound detector which superimpose the noise emitted from the noise source on the control sound outputted from the control sound output unit for the purpose of detection, wherein a plurality of noise detectors and control sound output units are arranged for each seat, and the plurality of noise detectors are arranged in higher density for each seat in a specific direction.

Due to such a configuration, it becomes possible to detect a sound made by synthesizing the noise emitted from the noise source with the control sound for noise reduction that is outputted from the control sound output unit. Accordingly, the effect of noise reduction can be detected by adding the control sound to optimize the control sound. In this way, it is possible to realize the enhancement of noise reducing effect and to provide a high-quality noise reduction device.

Also, the noise reduction system of the present invention comprises a system control device with the above-mentioned noise reduction devices respectively installed in a plurality of seats arranged in a space for controlling the communication lines for connecting the noise reduction devices installed in the plurality of seats and the noise reduction devices connected by the communication lines.

Due to such a configuration, it becomes possible to realize system control by installing noise reduction devices in a plurality of seats arranged in a space. Accordingly, it is possible to provide a control system capable of realizing noise reduction at a plurality of seats arranged in a space.

BRIEF DESCRIPTION OF THE DRAWINGS

FIG. 3A is a block diagram showing the basic configuration of a noise reduction device in the preferred embodiment.

FIG. 3B shows a method of superimposing the noise emitted from a noise source on the control sound output from a speaker of the noise reduction device in the preferred embodiment.

FIG. 4A is a front view showing an installation example of a noise reduction device in the preferred embodiment.

FIG. 4B is a plan view showing an installation example of a noise reduction device in the preferred embodiment.

DESCRIPTION OF REFERENCE MARKS

Figure 1:
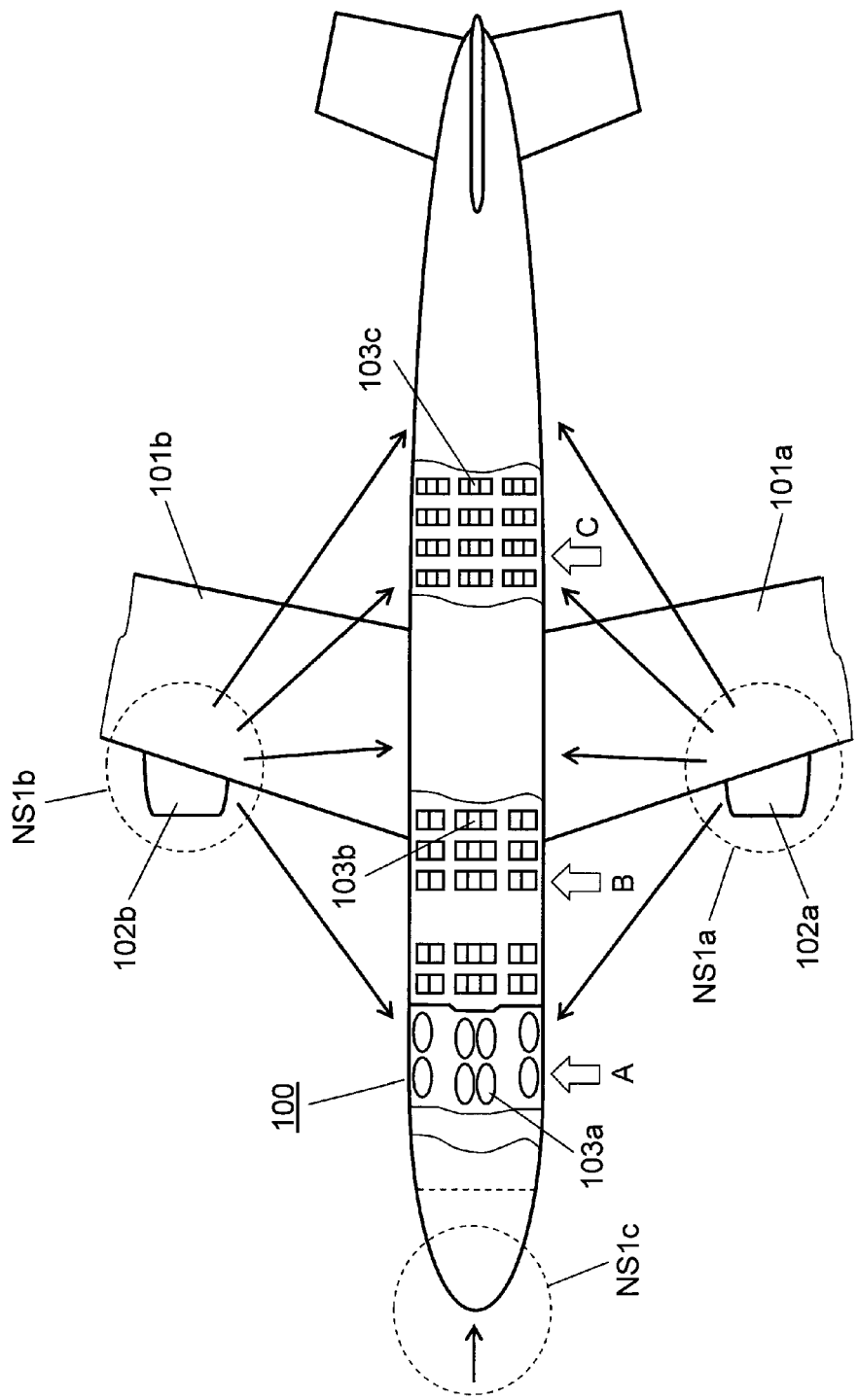
FIG. 1 is a plan view showing the installation environment of a noise reduction device in the preferred embodiment of the present invention.

100 Airplane
100a Cabin
101a, 101b Wing
102a, 102b Engine
103a, 103b, 103c Passenger seat array
104 System control device
105, 402, 502, 602, 702 Seat
300, 400, 802a to 802d, 902a to 902d Noise reduction device
301, 401, 501, 701 User
301b Ear
310, 510a, 510b, 810a, 910a, NS1a, NS1b, NS1c, NS2a, NS2b, NS2c, NS2d,
NS2e Noise source
310N, 340N, 510N, 810N, 910N, SA, SA1, SA2, SB, SB1, SB2 Main noise passage (route)
320 Noise detector (microphone)
330, 430 Noise controller
331, 335 A/D converter
332 Digital filter
333 Filter renewing unit
334 D/A converter
340 Control sound generator (speaker)
350 Error detector (error microphone)
401a, 501a, 701a Head
402aa, 402ab Elbow-rest
402b, 702b Head-rest
420a, 420b, 450a, 450b, 520a1 to 520a7, 520b1 to 520b3, 820, 920, 920a1,
920b1 Microphone
440a, 440b, 740 Speaker
MA, MB, MA1, MA2, MB1, MB2 Microphone array
N1, N2 Direction of microphone
α Spreading angle

PREFERRED EMBODIMENTS FOR CARRYING OUT THE INVENTION

The preferred embodiments of the present invention will be described in the following with reference to FIG. 1 to FIG. 8.

Preferred Embodiment

Regarding the noise reduction device in the preferred embodiment of the present invention, an example of installing the device in an airplane is described in the following.

First, sound environment in an airplane required to be provided with a noise reduction device is described with reference to FIG. 1 and FIG. 2.

FIG. 1 is a plan view showing the installation environment of the noise reduction device in the preferred embodiment of the present invention. As shown in FIG. 1, airplane 100 comprises engines 102a, 102b mounted in the right and left wings.

From the viewpoint of sound environment of the airplane, not only rotating sound but also echoes due to air current are generated from the engine during flying. Therefore, the engine occupies an important position as a noise source. From the viewpoint of passenger services, engines 102a, 102b act upon each part of the airplane body as external noise sources NS1a, NS1b, for example, with respect to seat arrays 103a, 103b, 103c disposed in cabin A (e.g. first class), cabin B (e.g. business class), and cabin C (e.g. economy class), and also, bumping sound (air cutting noise) generated by the air current bumping against the end portions or both wings of the airplane as the airplane body moves through the air at a high speed serves as noise source NS1c and gives bad influences to information services or the like in the airplane.

Figure 2:
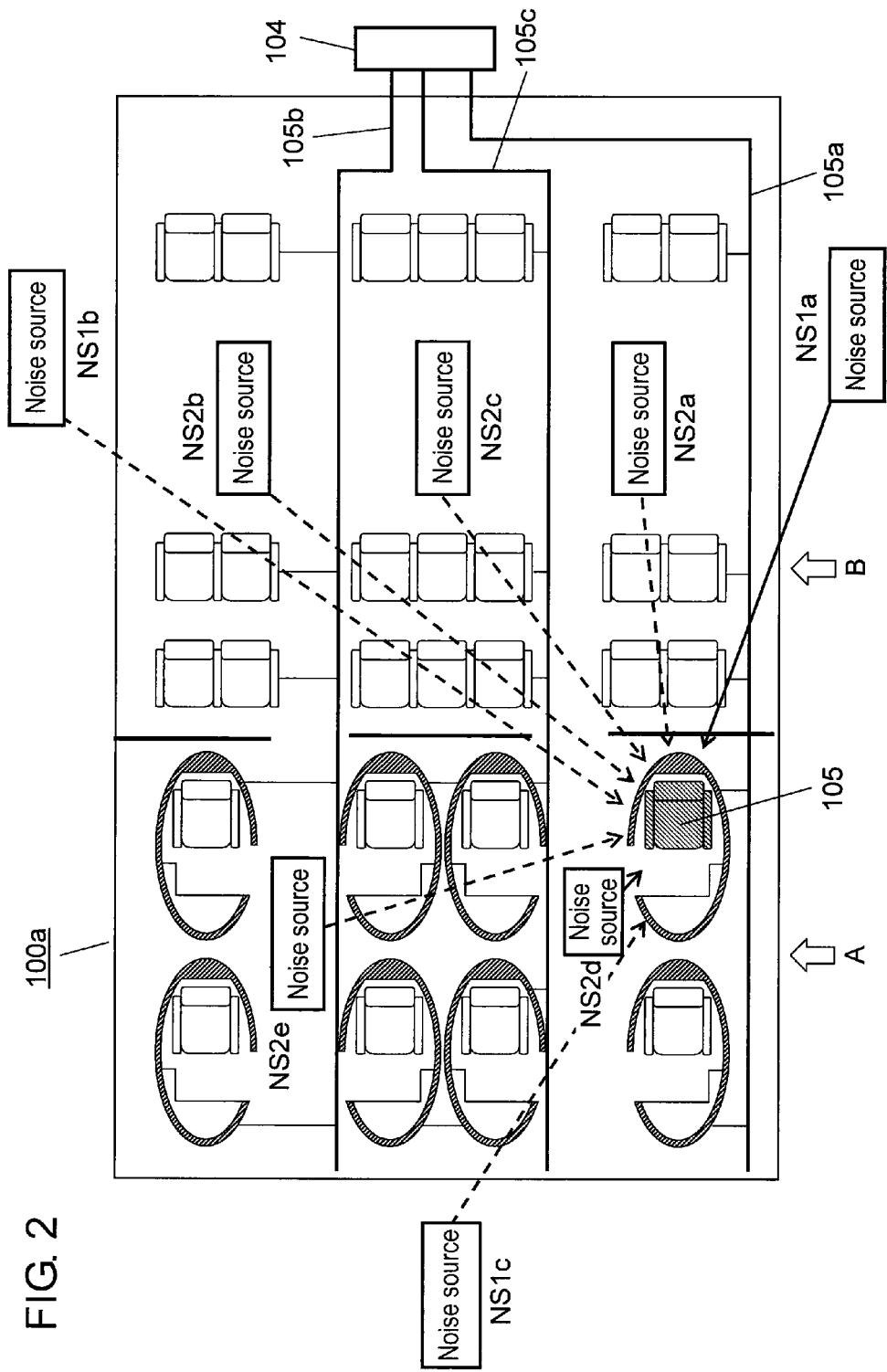
FIG. 2 is a plan view showing the detail of installation environment of a noise reduction device in the preferred embodiment.

FIG. 2 is a plan view showing the detail of installation environment of the noise reduction device, in which the arrangement of seats in cabin A and cabin B shown in FIG. 1 is partially enlarged. Cabin 100a is divided into cabin A and cabin B by using a wall, and seat arrays are disposed in cabin A and cabin B respectively. Also, each seat array is furnished with hearing equipment and connected to system control device 104 provided with a switching device and data control server via communication lines 105a, 105b, 105c such as Internet (registered mark). On the other hand, as to the sound environment of cabin 100a, there exist external noise sources such as noise sources NS1a, NSs1b generated from engines 102a, 102b and air cutting noise NS1c generated at end portions of the airplane body, and in addition, noise sources NS2a to NS2e due to air conditioners or the like exist as internal noise sources. When such noise is considered as noise at one seat 105 disposed in cabin A, then seat 105 is subjected to the influences of noise from noise sources NS1a to NS1c generated by engine 102a (FIG. 1) installed in the wing outside the window and caused due to air current noise, and noise sources NS2a to NS2e generated by air conditioners.

Thus, when many noise sources separately exist in the airplane, for effectively achieving the purpose of noise reduction, it is necessary to install a plurality of microphones for noise detection around seat 105 (so as to surround the seat) in order to detect the noise coming in various directions. Also, even in case of one noise source, when the environment is such that the noise from a noise source as in an airplane is reflected from inner walls or windows of the airplane, it is also necessary to install a plurality of microphones for noise detection around seat 105 in order to detect the reflected noise coming in various directions.

Further, in cabin A, at seat 105, out of the noise coming from noise sources NS1a to NS1c and noise sources NS2a to NS2e, the noise from noise source NS1a caused due to the engine mounted in the left wing (FIG. 1) is probably strongest. Accordingly, in order to effectively realize the reduction of noise at each seat, out of the noise emitted in various directions, it is necessary to concentrate the measure on noise that is strongest for the user at the seat, giving bad influence to the sound environment of the seat.

Particularly, in the first class shown by cabin A in FIG. 1, the seat has a shell-like structure, and the shell is furnished with audio/video equipment such as television and radio for enjoying movies and music, a desk for business man, PC power source, etc. Thus, it is strongly required to provide a comfortable environment so that the passengers may relax or concentrate on business. To achieve the requirement, there is a strong demand for making the inside of the shell free from noise, and although a soundproof material is used for the shell itself, it is very important to efficiently reduce the noise around the shell or coming through the shell.

The basic configuration of the noise reduction device in the preferred embodiment of the present invention will be described in the following with reference to FIG. 3A, B.

FIG. 3A is a block diagram showing the basic configuration of the noise reduction device in the preferred embodiment of the present invention.

Noise reduction device 300 comprises noise detector 320, noise controller 330, control sound generator 340, and error detector 350. The configuration and the function are described in the following.

Noise detector 320 is disposed as a noise detecting unit for detecting noise emitted from noise source 310, which is a microphone (hereinafter referred to as microphone) having a function to detect noise information, convert it to electric signal, and output.

Noise controller 330 as a noise control unit comprises A/D converter 331, 335, digital filter 332, filter renewing unit 333, and D/A converter 334, which produces control sound signal for controlling the control sound generator 340 in order to minimize the detection error in accordance with noise information from microphone 320 that is a noise detecting unit and error information from error detector 350.

A/D converter 331 executes A/D conversion of noise signal from microphone 320 and outputs the signal to digital filter 332 and filter renewing unit 333. Digital filter 332 is formed of multi-stage taps, which is an FIR filter capable of freely setting the filter coefficient of each tap. The detection error information from error detector 350 in addition to the information from microphone 320 is inputted to filter renewing unit 333 via A/D converter 335, and each filter coefficient of digital filter 332 is adjusted so that the detection error is minimized. That is, control sound signal so as to become opposite in phase to the noise from noise source 310 is produced at the installation position of error detector 350, and it is outputted to the control sound generator via D/A converter 334. Control sound generator 340 is a speaker as control sound output unit, which is capable of converting the control sound signal received from D/A converter 334 to sound waves and emitting the output, having a function of emitting control sound that offsets the noise in the vicinity of ear 301b of user 301.

Error detector 350 as an error sound detecting unit detects the sound after noise reduction as an error, and executes the feedback with respect to the operational result of noise reduction device 300. In this way, it is possible to minimize the noise at the ear position of the user at all times even when the noise environment changes.

As shown in FIG. 3A, in noise reduction device 300 in the preferred embodiment of the present invention, noise emitted from noise source 310 is detected by microphone 320, and the signal is processed by noise controller 330 to output a control sound from speaker 340, then the noise emitted from noise source 310 is combined with phase-reversed sound and transmitted to ear 301b of user 301, thereby reducing the noise.

FIG. 3B illustrates a method of combining the control sound outputted from speaker 340 with the noise emitted from noise source 310.

When the noise spreading angle is a with respect to main noise passage 310N that connects noise source 310 to ear 301b of user 301, speaker 340 is arranged within spreading angle α. In this way, the phase-reversed control sound emitted from speaker 340 is combined with the noise before reaching ear 301b of user 301. Also, since error microphone 350 is arranged as an error detector within the combining region, sound after noise reduction is detected as an error, and it is subjected to feedback with respect to the operational result of noise reduction device 300, and thereby, the noise reduction effect can be enhanced.

An installation example of the noise reduction device will be described in the following.

FIG. 4A, B are a front view and a plan view showing an example of the noise reduction device in the preferred embodiment of the present invention, which is installed in a seat of an airplane.

Noise reduction device 400 is installed in seat 402, and microphones 420a, 420b (corresponding to noise detector 320 of FIG. 3A) are respectively disposed at the peripheral portions of elbow-rest 402aa and elbow-rest 402ab of seat 402. Heat-rest 402b is C-shaped, and head 401a is surrounded by head-rest 402b when user 401 is in seat 402. Also, head-rest 402b is furnished with noise controller 430 (corresponding to noise controller 330 of FIG. 3A) and speaker 440a, 440b (corresponding to control sound generator 340 of FIG. 3A). Speakers 440a, 440b are arranged in positions opposing to the ear with respect to head 401a of user 401. Also, microphones 450a, 450b (corresponding to error detector 350 of FIG. 3A) are respectively arranged as an error detector between head 401a and speakers 440a, 440b.

The detailed description of the noise reduction device as a structural characteristic in the preferred embodiment of the present invention will be given in the following with reference to FIG. 5 and FIG. 6A to C.

Figure 5:
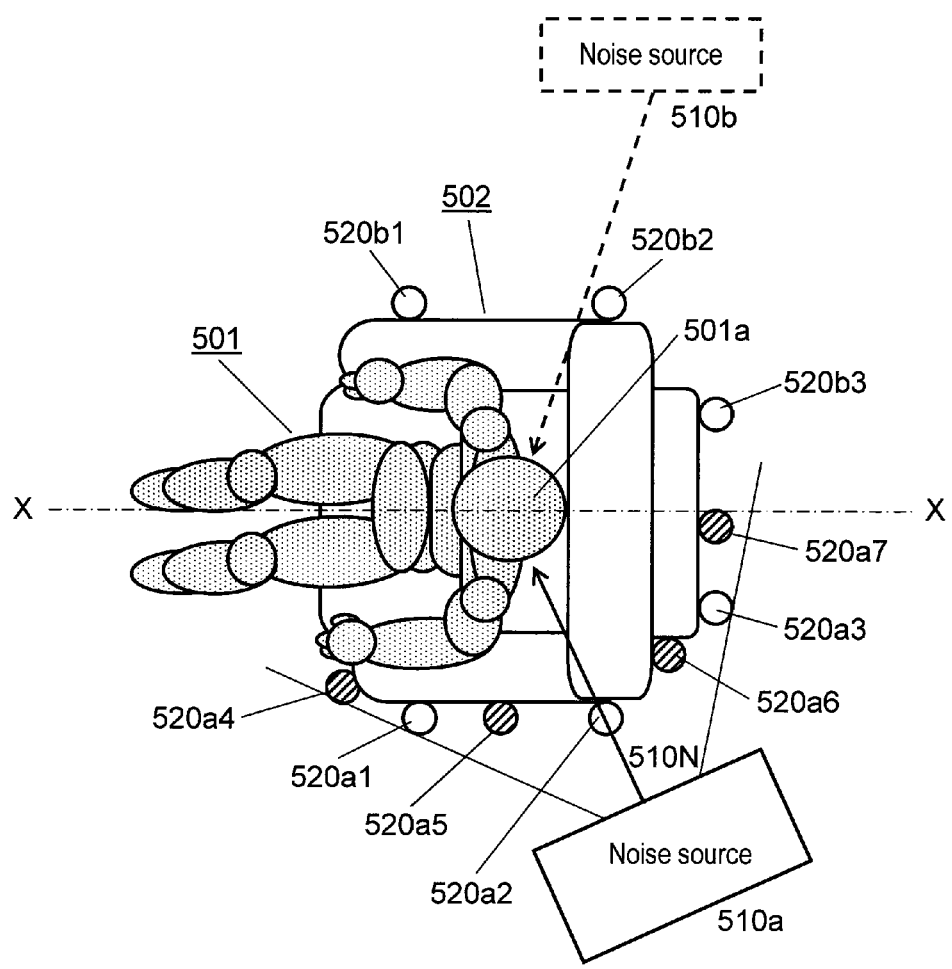
FIG. 5 is a plan view showing a detailed configuration of a noise reduction device in the preferred embodiment.
Figure 6A:
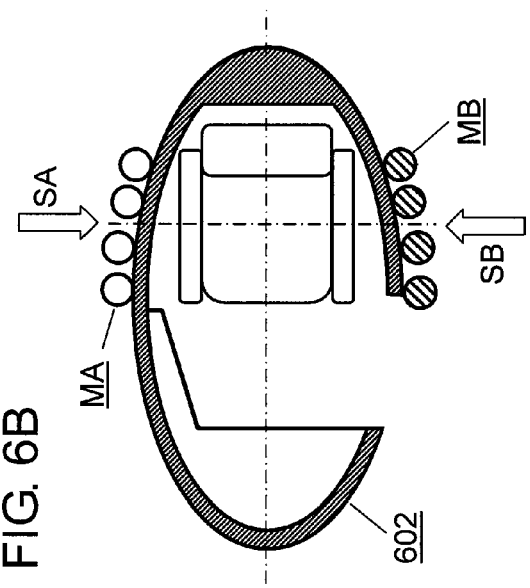
FIG. 6A is a plan view showing a detailed configuration of a noise reduction device in the preferred embodiment, in which the noise comes in the direction of front and behind.
Figure 6B:
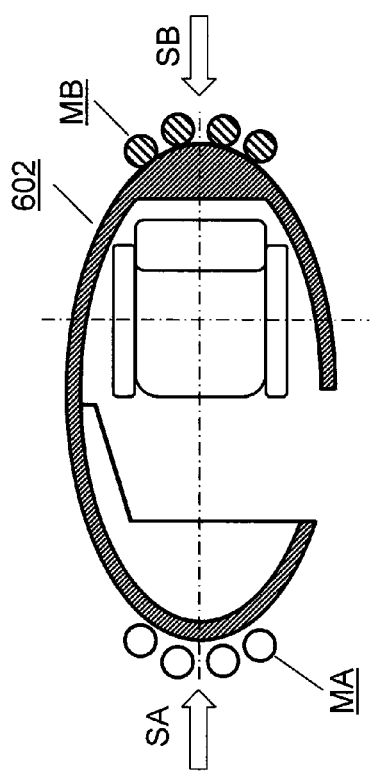
FIG. 6B is a plan view showing a detailed configuration of a noise reduction device in the preferred embodiment, in which the noise comes in the direction of right and left.
Figure 6C:
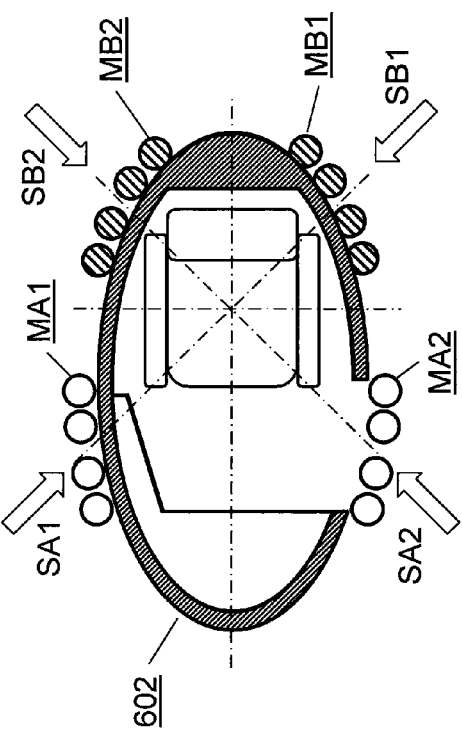
FIG. 6C is a plan view showing a detailed configuration of a noise reduction device in the preferred embodiment, in which the noise comes obliquely of the seat.

FIG. 5 is a plan view showing the detailed arrangement of microphone 520 (corresponding to noise detector 320 of FIG. 3A) for noise detection with respect to noise reduction device 400 in the preferred embodiment of the present invention. FIG. 6A to C are plan views showing arrangement examples of microphone 520 for noise detection of the noise reduction device at a seat of cabin A (FIG. 2) in the preferred embodiment of the present invention.

In FIG. 5, at the peripheral portion of seat 502, there are provided 10 microphones for noise detection (microphones 520a1 to 520a7, 520b1 to 520b3). Out of them, microphones 520a1 to 520a7 are arranged at the left-hand side in the forward direction of user 501 with respect to center line XX at seat 502, and microphones 520b1 to 520b3 are arranged at the right-hand side. Further, microphones 520a1 to 520a3 at the left-hand side are arranged at positions nearly symmetrical to microphones 520b1 to 520b3 at the right-hand side. In addition, microphones 520a4 to 520a7 are arranged at the left-hand side. In this arrangement, microphones 520a1 to 520a7 are arranged nearly symmetrically about microphone 520a2 arranged on main noise passage 510N that connects noise source 510a to the ear (not shown) of user 501 with respect noise source 510a being highest in noise level at seat 502. On the other hand, at the seat opposing to other noise source 510b farther from seat 502 as compared with noise source 510a, the number of the microphones arranged at the right-hand side is less than half as compared with the left-hand side. In this way, when noise source 510a and noise source 510b are scattered in different directions of seat 502, as shown in the present example, it is effective to arrange the 10 microphones for noise detection around seat 502 (so as to surround the seat) from the viewpoint of noise reduction. Moreover, noise being high in noise level can be accurately detected by arranging many microphones to cope with noise source 510a being higher in noise level, and consequently, the noise reduction effect can be enhanced.

In the configuration described above, noise reduction device 400 in the preferred embodiment of the present invention is characterized in that a plurality of microphones as noise detecting unit are arranged for each seat, and a plurality of microphones increased in density are arranged for each seat in a specific direction. That is, in FIG. 5, more microphones are arranged at the left-hand side than at the right-hand side. Further, the microphones for noise detection are arranged higher in density in the direction opposing to the noise source that is highest in level of noise reaching the seat. In addition, a plurality of microphones for noise detection are arranged in higher density in and near the main passage of noise emitted from the noise source being highest in noise level. Accordingly, the noise emitted from a noise source being highest in noise level can be positioned as noise of greatest influence at the seat, and the noise reaching the seat can be precisely and accurately detected as a noise distribution around the seat, and it is possible to realize a noise reduction device which assures high efficiency and high quality.

FIG. 6A to C show the directions of noise coming to one seat 602 out of the seat array arranged in cabin A (e.g. first class) in FIG. 2. FIG. 6A is a case when noise comes to seat 602 in the forward and backward direction. FIG. 6B is a case when noise comes to seat 602 in the right and left direction. FIG. 6C is a case when noise comes to seat 602 in the oblique direction. For example, in the case of FIG. 6A, when noise comes to seat 602 in the forward and backward direction due to the highest noise passage SA or passage SB, in the noise reduction device in the preferred embodiment of the present invention, the highest noise passage SA or passage SB is specified with respect to the relevant seat 602, and microphones for noise detection such as microphone array MA or microphone array MB (corresponding to noise detector 320 of FIG. 3A) are arranged in high density against the noise in the specified direction. The same holds true for FIG. 6B and FIG. 6C. In FIG. 6C, microphone arrays MA1, MB1, MA2, MB2 (corresponding to noise detector 320 of FIG. 3A) are respectively arranged against noise passages SA1, SB1, SA2, SB2 obliquely reaching the seat, and thereby, microphones for noise detection are arranged in high density in the specified direction. That is, in the noise reduction device in the preferred embodiment of the present invention, out of the noise emitted from various noise sources in a space where the device is installed, the direction of noise by which the seat to be reduced in noise is most affected is specified, and in the direction of the specified noise coming thereto, microphones for noise detection are arranged in high density against the noise.

An application example of the noise reduction device will be described in the following.

Figure 7A:
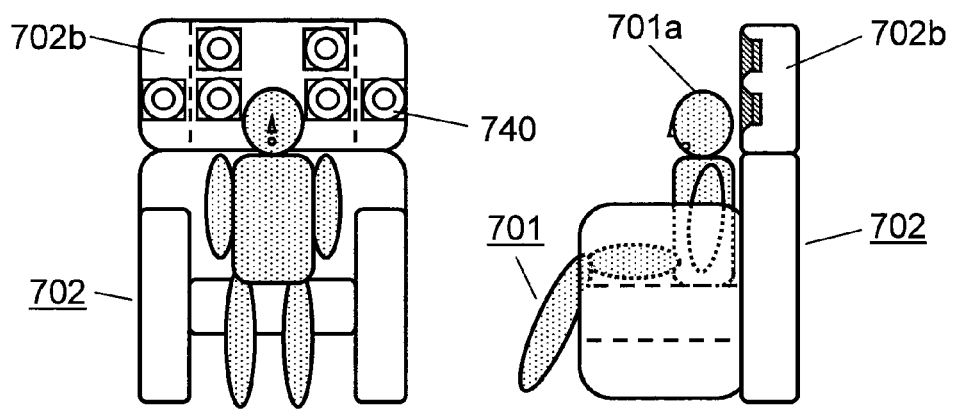
FIG. 7A is a front view and side view showing an application example of a noise reduction device in the preferred embodiment, in which the head-rest is planer in shape.
Figure 7B:
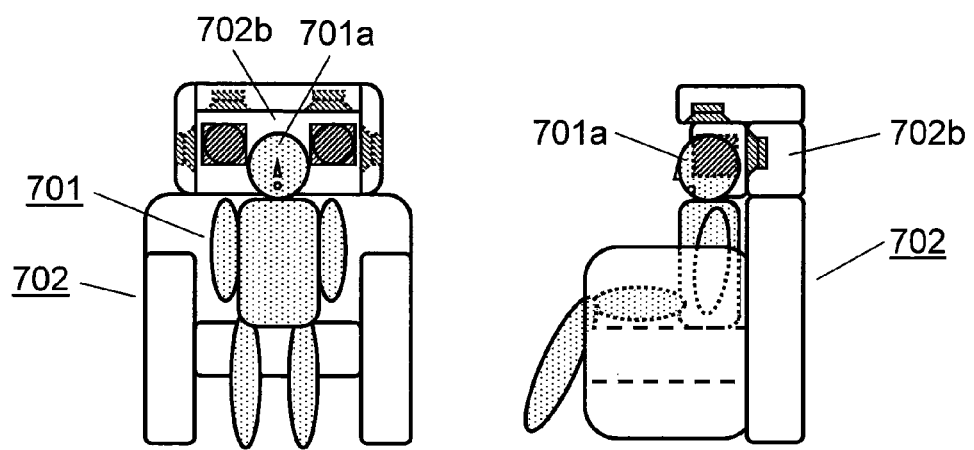
FIG. 7B is a front view and side view showing an application example of a noise reduction device in the preferred embodiment, in which the head-rest is nearly capsule-like in structure.

FIG. 7A, B are a front view and a side view showing an application example of the noise reduction device in the preferred embodiment of the present invention. FIG. 7A, B show an example of increasing the number of speakers 740 (corresponding to control sound generator 340 of FIG. 3A) arranged at head-rest 702b of seat 702. In FIG. 7A, head-rest 702b has a plate-like structure, and in FIG. 7B, head-rest 702b has a capsule-like structure. A plurality of speakers 740 are installed at rear and both sides of head 701a of user 701 respectively, thereby achieving the purpose of stratification with respect to at least one of the detected noise frequency and noise source. In this way, control sound is emitted from the right-hand speaker against the right-hand noise source, while it is emitted from the left-hand speaker against the left-hand noise source. In this way, the speaker arranging positions are divided by the directions of noise sources, and it is possible to allocate a plurality of speakers by frequency bands. Accordingly, it is possible to realize a noise reduction device which assures high quality and excellent comfortability.

A noise reduction system using a noise reduction device in the preferred embodiment of the present invention will be described in the following with reference to FIG. 8 and FIG. 9.

Figure 8:
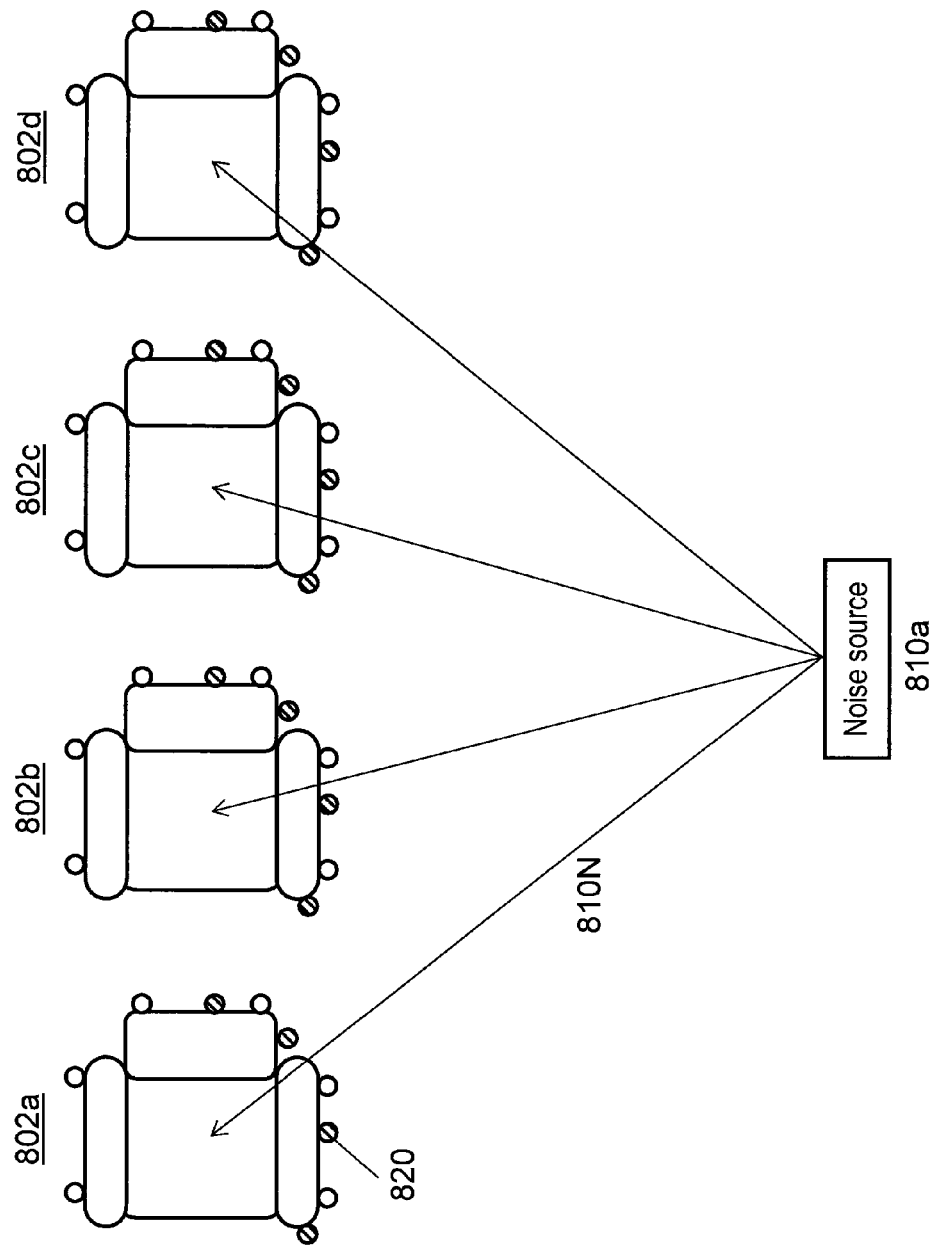
FIG. 8 is a plan view showing the basic configuration of a noise reduction system using noise reduction devices in the preferred embodiment.

FIG. 8 is a plan view showing the basic configuration of the noise reduction system using the noise reduction device in the preferred embodiment of the present invention. FIG. 9 is a plan view showing an application example of the noise reduction system.

FIG. 8 shows an example of installing noise reduction devices 802a to 802d, . . . in the preferred embodiment of the present invention in the seat array of cabin 100a that is a space in an airplane shown in FIG. 2. In this case, the arranging positions and functions of microphones 820 for noise detection (corresponding to noise detector 320 of FIG. 3) in noise reduction devices 802a to 802d, . . . are supposed to be same, and neither adjustment nor setting is made for each seat with respect to differences of main noise passage 810N of noise from noise source 810a.

Figure 9:
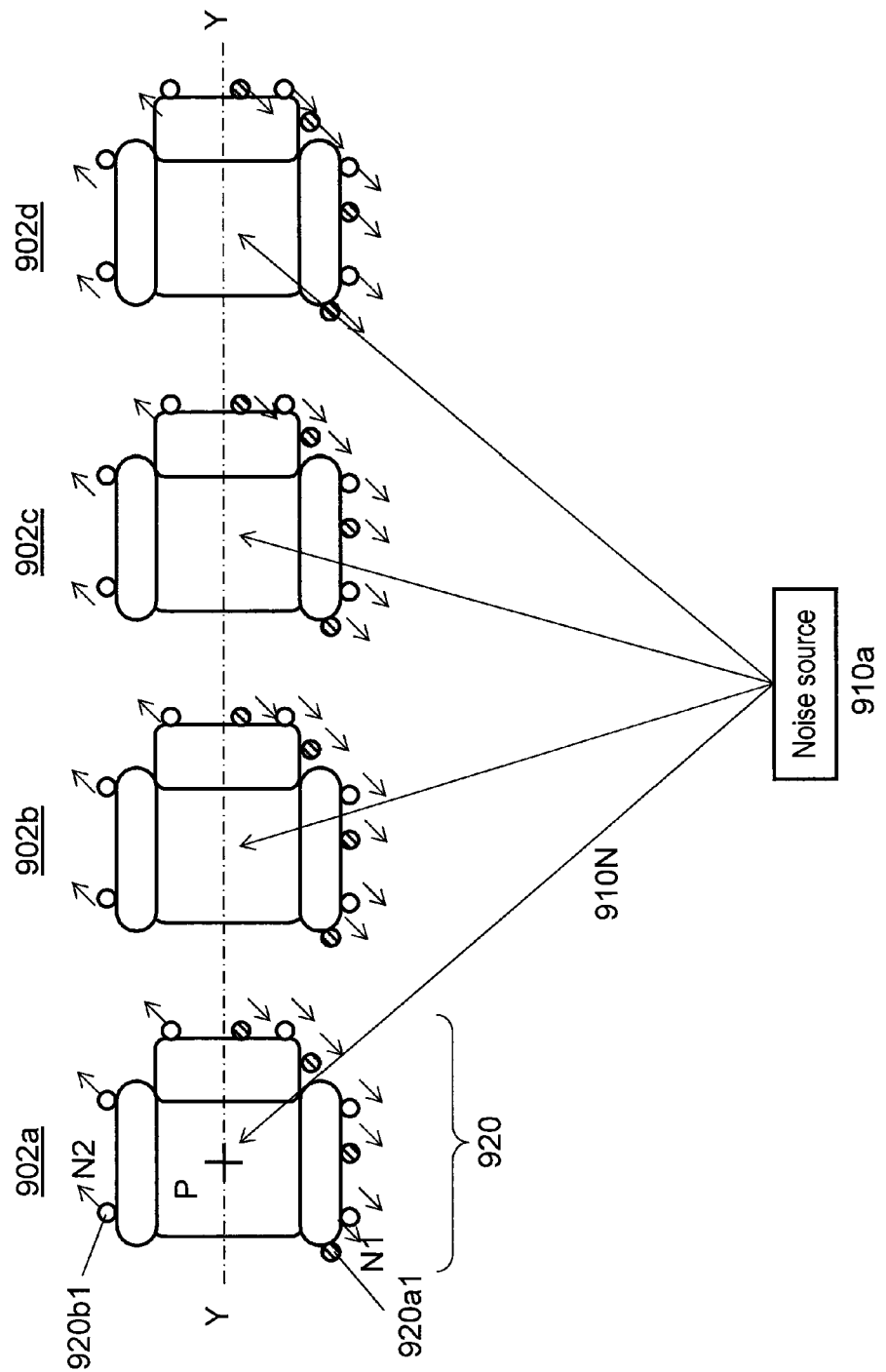
FIG. 9 is a plan view showing an application example of a noise reduction system using noise reduction devices in the preferred embodiment.

On the other hand, in FIG. 9, differences are provided for each seat with respect to the arranging positions or functions of microphones for noise detection in noise reduction devices 902a to 902d, . . . . In noise reduction device 902a, with respect to main noise passage 910N of noise reaching the central position P of the seat from noise source 910*a*, for example, the direction of installation of microphone 920*a*1 (corresponding to noise detector 320 of FIG. 3A) is N1, and main noise passage 910N and installation direction N1 of microphone 920*a*1 are nearly parallel with each other. On the other hand, in microphone 920*b*1 (corresponding to noise detector 320 of FIG. 3A) arranged in position nearly symmetrical to microphone 920*a*1 with respect to center line YY of the seat, the microphone installation direction is N2 that is nearly symmetrical to N1 in order to detect noise emitted from other noise sources (not shown). The same holds true for noise reduction devices 902*b* to 902*d*, . . . As a method of providing every seat with differences in adjustment and setting, it is also possible to utilize the directional characteristics of microphones, the number of microphones, or their positions.

In the noise reduction systems shown in FIG. 8 and FIG. 9, as shown in FIG. 2, a noise reduction device installed in each seat is connected to system control device 104 via communication lines 105*a* to 105*c*, so that the operation and function of the noise reduction device can be controlled all together or in a systematic fashion.

In the preferred embodiment of the present invention, a noise reduction device is installed in each seat, but in case of adjacent seats connected to each other, for example, a noise detecting unit (noise microphone) is used by the adjacent seats so that the structural elements of the noise reduction device can be used in common, thereby realizing the simplification of the noise reduction device and noise reduction system, and it is possible to obtain similar effects. In this way, it is possible to realize a high-efficiency and low-cost noise reduction device and noise reduction system.

Also, in the preferred embodiment of the present invention, engine is supposed to be main noise source, but noise source is not limited to this. Besides noise of equipment for generating thrust of an airplane such propellers and engines in particular, complicatedly superimposed noise from many noise sources existing in the installation environment comes to the seat such as air cutting noise during flying, noise related to air current generated along with the movement of the airplane in the air, noise generated by air conditioning systems such as air conditioners, voice related to information service in the cabin, and indirect noise reflected from wall surfaces.

Also, the preferred embodiment of the present invention, as shown in FIG. 3A, comprises error detector (error microphone) 350 for detecting control sound outputted from control sound generator (speaker) 340 in addition to noise detector (microphone) 320 as a noise detecting unit for detecting noise emitted from noise source 310, wherein the error of control sound can be corrected by detecting the synthetic sound of noise and control sound by means of error microphone 350. However, error microphone 350 is not an essential component element for the noise reduction device in the preferred embodiment of the present invention. Since error microphone 350 is usually disposed in the vicinity of the head of the user, the seat configuration near the user's head can be simplified by omitting error microphone 350. Accordingly, it is possible to realize a comfortable and low-cost noise reduction device which hardly gives mental pressure to the user. Further, in the preferred embodiment of the present invention, the noise emitted from a noise source being highest in noise level is positioned as noise of greatest influence at the seat, and microphones for noise detection are arranged in high density in the direction of the noise source or in the direction of noise coming. However, noise being high in noise level is not always offensive to the human ear. The human sense of hearing has frequency characteristic, and even low level noise may sometimes become a source of discomfort. Accordingly, taking into account the frequency characteristic of the human sense of hearing as well as noise level, the microphones for noise detection are arranged in high density in the direction of noise coming to be reduced, and thereby, it is possible to obtain most desirable noise eliminating effect.

As described above, by using the noise reduction device and noise reduction system in the preferred embodiment of the present invention, it is possible to specify the direction that is important with respect to a specific noise source and to arrange the noise detecting unit in high density in the specified direction. Accordingly, it is possible to realize the enhancement of noise detection efficiency and to provide a high-efficiency high-quality noise reduction device. In this way, it is possible to provide a low noise environment that is effective for the user in a cabin of an airplane or train, improving the comfortability.

INDUSTRIAL APPLICABILITY

The noise reduction device and noise reduction system of the present invention are capable of enhancing the noise detection efficiency in order to provide a noise reduction device that assures excellent efficiency and high quality. Accordingly, the noise reduction device and noise reduction system are effective to be used in spaces as in airplanes, trains, cars, etc. where noise is generated.

The invention claimed is:

1. A noise reduction device comprising:
a noise detecting unit for detecting noise emitted from a plurality of noise sources;
a noise control unit for generating a control sound signal to reduce noise detected by the noise detecting unit; and
a control sound output unit for outputting a control sound based on control sound signal from the noise control unit,
wherein a plurality of the noise detecting units and control sound output units are arranged around each seat, and more noise detecting units among the plurality of noise detecting units are arranged in a side of each seat closer to a noise source having the highest noise level among the plurality of noise sources than the other side of each seat.

2. The noise reduction device of claim 1,
wherein the plurality of noise detecting units are arranged in higher density in a direction of noise coming.

3. The noise reduction device of claim 1,
wherein the plurality of noise detecting units are arranged in higher density in a direction opposing to a noise source being highest in a level of noise coming to the seat.

4. The noise reduction device of claim 1,
wherein the plurality of noise detecting units are arranged in higher density in and near a main passage of noise emitted from a noise source being highest in a noise level.

5. The noise reduction device of claim 1,
wherein the plurality of noise detecting units are arranged at a peripheral portion of the seat.

6. The noise reduction device of claim 1,
wherein at least one of a installation direction and a directional characteristic of the noise detecting unit is changeable.

7. A noise reduction device comprising:
a noise detecting unit for detecting noise emitted from a plurality of noise sources;

a noise control unit for generating a control sound signal to reduce noise detected by the noise detecting unit;

a control sound output unit for outputting a control sound based on control sound signal from the noise control unit; and an error sound detecting unit for detecting by superimposing noise emitted from the noise source on control sound outputted from the control sound output unit, wherein a plurality of the noise detecting units and the control sound output units are arranged around each seat, and more noise detecting units among the plurality of noise detecting units are arranged in a side of each seat closer to a noise source having the highest noise level among the plurality of noise sources than the other side of each seat.

8. The noise reduction device of claim 1 or claim 7, wherein at least one noise source is an engine.

9. A noise reduction system comprising:

the noise reduction devices of claim 1 or claim 7 installed in a plurality of seats arranged in a space; and a system control device for controlling communication lines connecting the noise reduction devices installed in the plurality of seats and the noise reduction devices connected by the communication lines.

10. The noise reduction system of claim 9, wherein at least one of the installation direction and directional characteristic of the noise detecting unit is set for each of the seat.

11. The noise reduction system of claim 9, wherein the space is a cabin of an airplane or a train.

* * * * *